April 29, 1969            H. OETIKER            3,441,134
PNEUMATIC SEPARATOR AND BULK SOLIDS FEEDER
Filed Oct. 19, 1966
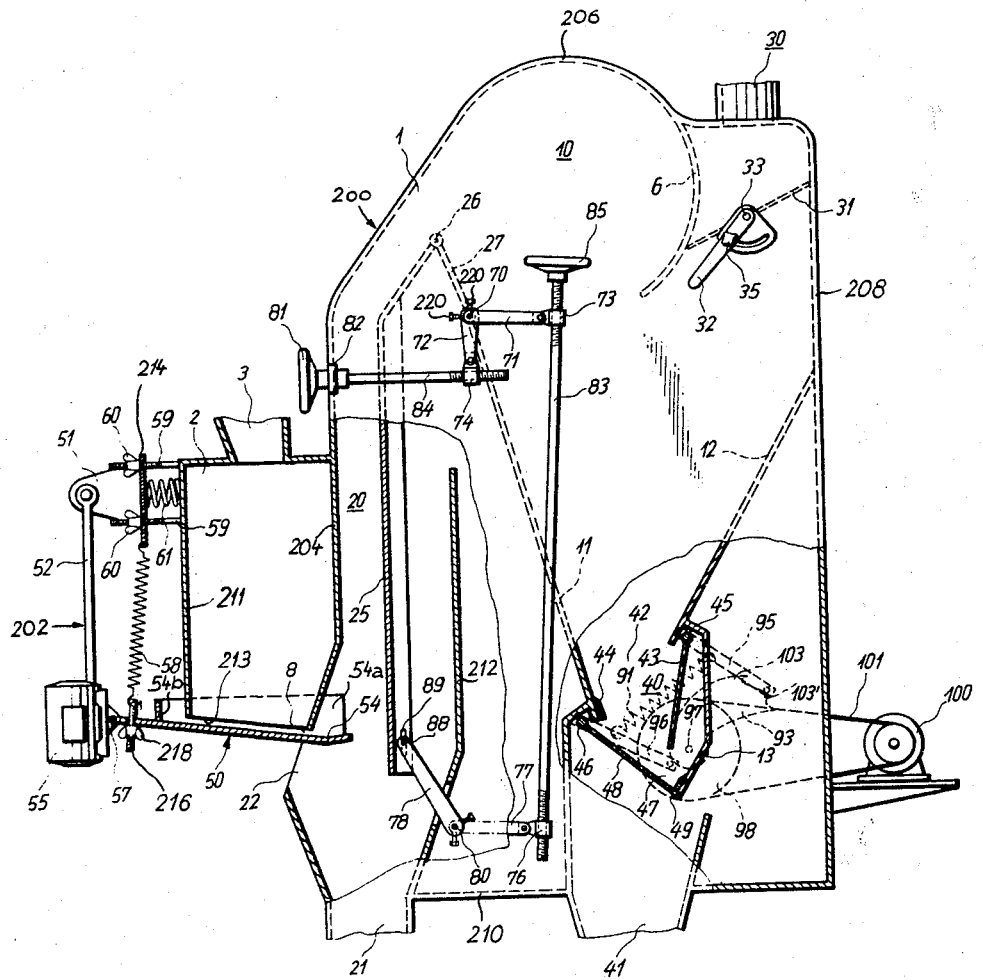
INVENTOR.
HANS OETIKER
BY
ATTORNEYS United States Patent Office 3,441,134
Patented Apr. 29, 1969

3,441,134
PNEUMATIC SEPARATOR AND
BULK SOLIDS FEEDER
Hans Oetiker, Saint Gall, Switzerland, assignor to
Gebruder Buhler AG, Oberuzwil, Switzerland, a
company of Switzerland
Filed Oct. 19, 1966, Ser. No. 587,765
Claims priority, application Switzerland, Oct. 20, 1965,
14,489/65
Int. Cl. B07b 7/08; B03d 1/00
U.S. Cl. 209—139                    17 Claims

ABSTRACT OF THE DISCLOSURE

Pneumatic separator has a vertical passageway defined by walls one of which is mounted for separate and combined displacement of top and bottom portions thereof for varying flow area. The other wall is provided with an opening for introduction of solid particles from a vibratory feeder and for admittance of air from beneath the feeder. The feeder has a hopper with a shaker blade forming its bottom. The shaker blade is pivotally and swingably suspended by adjustable members attached to the hopper.

---

This invention relates, in general, to devices for treating bulk material and to air sifters therefor and, in particular, to a new and useful device for continuously discharging a veil of bulk material and to an improved air sifter for such material which includes a passageway adjacent the discharge of the veil of material through which the material is adapted to be conducted by a flow of air, the passageway being bounded by at least one wall which may be shifted for varying the size of the air flow passage or its convergence or divergence.

Air sifters of various designs are known. All of the known sifters have the disadvantage that they are unsatisfactory when it is necessary to feed a varying load of material thereto because it is not possible to obtain the maximum sifting effect because they are not adjustable or are adjustable only to a limited extent. In addition, there is no means for varying the discharge of the fine material in varying quantities into the conducting air stream.

In accordance with the invention, there is provided an air sifter which includes a housing arranged adjacent a drop shaft for the material to be sifted. A shaker conveyor is arranged so that the conveyor blade is disposed across the bottom opening of a drop shaft for the material and it is mounted so that the blade may be adjusted for varying the opening of the drop shaft. The material which exits from the blade is delivered in a form of a veil into a sifting duct and it is conveyed upwardly in the duct by a conveying air stream with the heavier material being permitted to discharge downwardly. A feature of the sifter construction is that the sifting duct includes at least one wall which is displaceable so that the duct passage may be varied as to width or convergence or divergence in accordance with the material quantities and types which are being handled. In the preferred form the adjustable wall is pivoted to the upper end of a fixed discharge wall which connects to the sifting duct at its upper end. The air conveyed sifted material is directed against a curved wall after passing through the sifting duct and it is collected below the curved wall and above a double outlet gate. The gate includes an outlet compartment which is alternately closed and opened at its top and bottom ends to permit cyclical intake and discharge of the material which has been sifted without the inflow or outflow of quantities of air.

Accordingly, it is an object of the invention to provide an improved device for delivering bulk material through a drop shaft in varying quantities which includes a shaker conveyor blade disposed across the bottom opening of the drop shaft for the bulk material and arranged to be driven to provide a shaking and conveying movement to discharge material between the blade and the walls of the drop shaft and off the end of the blade in the form of a thin veil of material and which further includes means for adjustably positioning the blade in respect to the outlet of the drop shaft.

A further object of the invention is to provide a sifter device which includes a sifting duct for the passage of air entrained bulk materials which includes a wall having means for adjusting the positioning of the wall for varying the size of the sifting duct and the convergence or divergence thereof.

A further object of the invention is to provide a sifting device which includes means for adjustably delivering quantities of material in a veiled discharge form into a sifting duct and which also includes means for adjusting the wall of the sifting duct to vary the flow characteristics therethrough and which also advantageously includes means for passing the sifted material through an intermediate discharge compartment or gate having a closing flap at each end and with means for synchronizing the movement of the closing flaps so that one is closed when the other is opened.

A further object of the invention is to provide a sifting device for providing a uniform discharge of the bulk material which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

The only figure of the drawings is a partial side elevational and partial transverse sectional view of a sifter having an improved conveying means associated therewith and having an adjustable sifting duct constructed in accordance with the invention.

Referring to the drawing in particular, the invention embodied therein comprises an air sifting device generally designated 200 having associated therewith a device for discharging bulk material in the form of a veil generally designated 202.

The sifting device 200 includes a housing 1 having a front wall 204 which curves upwardly at its upper end into a top wall 206. The top wall 206 is provided with an outlet port 30 which is located adjacent a rear wall 208. A bottom wall 210 is provided with a heavy material outlet 21 and a fine material outlet 41. The interior of the housing 1 includes downwardly converging fixed walls 11 and 12 which terminate in a discharge 42 for the sifted material which communicates with a gate or intermediate chamber 40 for the discharge of the finer materials through the outlet 41. A wall 212 extending upwardly from a coarse material outlet 21 is located between the wall 11 and an adjustable plate or wall member 25.

The air sifting device 200 is normally used in conjunction with means for delivering the bulk material to the sifting duct 20 defined between the adjustable wall 25 and the front wall 204. In accordance with a feature of the invention, such means includes a shaker conveying means for delivering the material in the form of a veil of material which is deposited within the lower end of the sifting duct 20 and above an air inlet 22 defined in the front wall 204 of the sifting device 200.

Material to be sifted is directed into an inlet port 3 and it is permitted to move downwardly in a drop shaft 2 which is defined between the front wall 204 of the sifting device and a wall 211 spaced outwardly therefrom. As indicated in the drawings, the lower end of the drop shaft is provided with an inclined bottom opening 213 through which the material to be sifted may be dropped. Associated with the drop shaft is the shaker conveyor generally designated 50 which includes a shaker conveyor blade 54 which is connected to a drive shaft member 57 which imparts a vibratory motion to the blade under the influence of two asynchronous motors 55 which are mounted at the end of a pendulum member 52. The blade 54 includes a vertical side wall 54a on each side of the drop shaft 2 and a vertical rear wall 54b. The pendulum member 52 is suspended from a bracket 51 which is carried on a plate 214 which is adjustably positioned in respect to the wall 211 of the drop shaft 2.

A feature of the shaker conveyor construction is that the cooperative association of the blade 54 with the discharge opening 213 of the drop shaft 2 may be adjusted by varying the tension on a spring 58 which is connected at its upper end to the plate 214 and at its lower end to a bolt member 216 on the blade 54 which may be adjusted by a wing nut 218 at its lower end. In addition to this adjustment, the plate 214 may be adjusted against the force of a compression spring 61 by tightening or loosening wing nuts 60 which are threaded on bolt members 59 which extend outwardly from the wall 211. This latter adjustment permits a variation of the width of the opening of the shaker blade 54 which will extend into the lower end of the sifting duct 20.

The material which is delivered outwardly through the opening 213 of the drop shaft 2 and along the blade 54 of the shaker conveyor is directed into the lower end of the sifting duct 20 in the form of a veil or uniform fine stream. The air for sifting which is admitted through the opening 2 will flow upwardly and cause the lighter particles of the material to flow upwardly therewith along the sifting duct 20. The heavier particles will fall outwardly through the material opening 21. The flow characteristics within the sifting duct 20 can be varied by changing the position of the adjustable plate or wall member 25. For this purpose, the plate 25 is pivoted at 26 to the upper end of a swivel flap 27 which is pivotally mounted on a shaft 70 carried within the housing adjacent the upper end of the wall 11. At a location outside of the housing 1, there are provided arms 71 and 72 which are secured to the shaft 70 and may be adjustably tightened in respect thereto by nuts 220. The arms 71 carry at their outer ends a nut member 73 which is pivoted thereto and the arm 72 carries a nut 74 which is pivoted to this arm. The nut 73 is internally threaded and is engaged on external threads defined on a spindle member 83. The nut 74 is internally threaded and is engaged on threads of a spindle member 84. The spindle members 83 and 84 may be rotated by hand wheels 85 and 81, respectively, to cause the movement of the nuts 73 and 74 and hence the displacement of the pivotal shaft 70, the swivel flap 27, the pivot 26 and hence the location of the adjustable wall 25. The bearing 82 is provided for supporting the spindle 84 and the hand wheel 81. The opposite end of the spindle 83 is also threaded and engaged with an internally threaded nut 76 pivotally carried at the end of an arm 77 which has its opposite end secured on a journal or shaft member 80. At the interior of the housing, the shaft member 80 carries an arm 78 which is connected to the adjustable wall member 25 through a pin 88 which rides in a slot 89 defined in the lower end of the wall member. By rotating the hand wheels 81 and 85 selectively, the position of the plate 25 may be adjusted both parallel to the wall 204 and also in a manner such that the upper end or the lower end would be closer thereto or farther therefrom so that the sifting duct may be formed either with converging or diverging walls.

The material which is drawn upwardly through the sifting duct 20 by the air stream is directed around the curved upper portion of the top wall 206 and around a curved continuation 6 defined on the interior of the housing. The material separates from the air stream at the curved wall 6 and thereafter drops down upon the walls 11 and 12 and the air may escape through the air outlet port 30. A throttle member 31 is disposed between the curved surface 6 and the wall 208 and its position may be varied by means of a control lever 32 which is pivoted at 33 for the purpose of varying the amount of air which is permitted to escape through the outlet port 30. The member 32 after adjustment is fixed in position by tightening a knob 35 having an element which rides in a slot of the housing wall.

The material which falls downwardly along the walls 11 and 12 will be directed toward the slot 42 which will be initially closed by a pivotal flap 43 which is pivotally mounted on an axle 45 directly below the discharge slot 42. The wall 11 is provided with a packing 44 so that when the flap 43 is closed, it will tightly seal the opening and prevent any escape of air or material. The flap 43 closes one end of a discharge compartment 40. The other lowermost end of the compartment 40 is closed intermittently by a flap 48 which is pivoted on a bearing axle 46 and which in the position indicated in the drawing is in a closed position tightly sealed against a packing member 49. The flaps 48 and 43 are operated by means of actuating levers 96 and 95, respectively, which include cam follower pins at their free ends which are urged into engagement with a cam disk 93 which is rotatably mounted about an axis 97. A compression spring 91 disposed between the lever 95 and the lever 96 urges the two levers toward each other so that their cams ride over the surface of the cam disk 93. The cam profile is such that the flap 43 will open after the flap 48 is closed and the flap 43 will close immediately before the flap 48 is opened.

The actuating arms 95 and 96 are moved by the movement of the cam disk 93 which is driven from a motor 100 which drives a wheel 98 through a belt 101. The wheel 98 is carried on the same shaft 97 as the cam disk 93.

The operation of the device is as follows: The material to be sifted is directed into the inlet port 3 and into the drop shaft 2. The shaker conveyor is operated by rotating the synchronous motors 55 in opposite directions to set the blade 54 into rectilinear oscillation. Depending upon the amount of incoming material which is to be sifted and thus depending also on the material deposit which will exist in the drop shaft 2 over the conveyor shaker blade 54, the blade 54 will drop more or less with regard to the opening 212 of the drop shaft 2. This dropping is effected in dependence on the tension of the spring 58 by which the blade 54 of the shaker conveyor is elastically suspended. This causes a variation in the feed gap 8 between the shaker conveyor blade 54 and the drop shaft 2. Since the bracket 51 on which the shaker conveyor 50 is suspended by means of the pendulum 52 can be varied by the nuts 60 on the threaded bolts 59, the width of the opening of the conveyor blade 54 into the sifting duct 20 can also be varied. The air used for sifting is sucked through the inlet port 22. The material which is delivered off the end of the blade 54 is directed upwardly through the sifting duct 20. The lighter particles will move upwardly with the air and the heavier good grain will drop into the material outlet 21.

A feature of the operation is that the siftability of the material may be adjusted by also adjusting the plate 25 using the hand wheels 81 and 85. The adjustment may take the form of a shifting of the plate 25 parallel to the wall 204 or shifting one end more or less than an opposite end. For example, it is possible to reduce the passage between the adjustable wall 25 and the wall 204 at the upper end in order to provide for a throttling or high velocity air flow which will cause a rise in the material veil. The fine material carried along with the air current through the sifting duct 20 will be separated from the sifting air along the curved limitation wall 6 in the separation chamber 10 and the fine grain material will arrive at the outlet gate 40 at the lower end of the converging walls 11 and 12. The dust-laden sifting air can be withdrawn through the opening 30 as controlled by the positioning of the throttle member 31.

In the outlet gate 40 for the fine material, the two swivel flaps 43 and 48 will be alternately opened and closed. The opening and closing of the swivel flaps 43 and 48 will be controlled by the cam disk 93 and by the tension spring 91. The cam disk 93 is provided with two offsets 103 and 103′ in the periphery thereof in order to effect a double striking of the swivel flaps 43 and 48 to insure the elimination of any fine material which may adhere thereon. The operation of the flaps 43 and 48 is such that no false air can hinder the separation of the materials and there will be no unnecessary escape of air through the compartment 40.

Thus, the apparatus provides a device in which the feeding by means of shaker conveyors into the sifting duct may be accomplished over the entire feeding width in a very uniform material veil. Because the shaker conveyor blade 54 is supported elastically below the drop shaft, it it possible to effect an automatic adjustment dependent on load during feeding which is accomplished by the variation of the gap between the blade and the end of the drop shaft. With such a construction there is the decided advantage of a constant load dependent feed into the sifting duct. The width opening of the shaker conveyor can also be varied by varying the position of the bracket on which the conveyor is swingably and elastically suspended.

A very effective influence on the siftability is obtained by varying the position of the plate 25 with the sifter housing 1. The variation may be accomplished not only to change the cross section of flow, but also to change the flow characteristics by providing a nozzle flowing effect, for example.

The use of an outlet gate for the fine material located in the separation chamber which extends over the entire width of the discharge slot insures that a very reliable outflow of the fine material will be effected throughout and also insures a maximum cleanliness of this separating chamber. The mechanism for operating the flaps insures that the flap elements will be cleaned periodically of any fouling dust. The pivotal flaps may be operated to cause the striking thereof against the side walls or for the shaking of the dust therefrom and they may be also positioned back into sealing engagement at the selected location in order to insure that there is no undue leakage of air. The discharge of air may be, in turn, adjusted by the use of the throttle valve located in the air outlet port to provide an additional adjustment for the characteristic operation of the device.

While a specific embodiment of the invention has been shown and described in detail to illustrate the application of the inventive principles, it will be understood that the invention may be embodied otherwise without departing from such principles.

What is claimed is:

1. An apparatus for the veil-like discharge of bulk material comprising, a drop shaft into which the material is directed having a lowermost opening, a shaker conveyor associated with said drop shaft including a shaked blade located below the opening of said drop shaft in a position to receive the material from said shaft, means for vibrating said shaker blade to cause the material deposited thereon from said drop shaft to be moved therealong and drop off the end in a fine flowing condition, means for swingably suspending said blade permitting shifting thereof in respect to the opening of said drop shaft in dependence upon the load of material exiting from said drop shaft, wherein said shaker conveyor includes a supporting bracket for mounting said shaker conveyor adjacent said drop shaft, said means swingably suspending said blade including a pendulum pivoted to said supporting bracket and carrying said shaker blade, said means for vibrating said shaker blade being carried by said pendulum and connected to said shaker blade.

2. An apparatus, according to claim 1, including an outlet gate for fine material defined in said housing adjacent said sifting duct and located below the uppermost portion of said duct to receive materials directed from the upper end of said duct, said outlet gate including wall means defining an intermediate chamber, a first pivotal flap adjacent one end of said intermediate chamber and a second pivotal flap located adjacent the opposite end of said chamber, and means for moving said flaps cyclically to close one flap and one end of said chamber and to thereafter open the other flap and the other end of said chamber and vice versa, said means for operating said flaps including means to strike said flap to move material thereof when said flaps are moved.

3. An apparatus for the veil-like discharge of bulk material comprising, a drop shaft into which the material is directed having a lowermost opening defining a mouth, a shaker conveyor associated with said drop shaft including a shaker blade located below the opening of said drop shaft in a position to receive the material from said shaft, mounting means connected to one end of said blade and pivotally supporting said one end for movement of the opposite end of said blade, toward and away from the lowermost opening of said drop shaft to open and close said mouth, a spring connected to said mounting means and to said blade at a spaced location from said one end and biasing said blade toward said mouth to close said mouth, means for adjusting the location and tension of said spring, means for vibrating said shaker blade to cause the material deposited thereon from said drop shaft to be moved therealong and drop off the end in a fine flowing condition, and means for swingably suspending said blade permitting shifting thereof in respect to the opening of said drop shaft in dependence upon the load of material exiting from said drop shaft.

4. An apparatus, according to claim 3, including an air sifter adjacent said drop shaft having an opening through which said shaker blade extends, means in said air sifter defining a sifting duct for the up flow or air therethrough and for receiving material which is delivered off the delivery end of said shaker conveyor, said means for swingably suspending said blade including a supporting bracket for mounting said shaker conveyor adjacent said drop shaft and for permitting adjustment of the delivery end of said shaker blade in said sifting duct in respect to said opening.

5. An apparatus for the veil-like discharge of bulk material comprising, a drop shaft into which the material is directed having a lowermost opening, a shaker conveyor associated with said drop shaft including a shaker blade located below the opening of said drop shaft in a position to receive the material from said shaft, means for vibrating said shaker blade to cause the material deposited thereon from said drop shaft to be moved therealong and drop off the end in a fine flowing condition, means for swingably suspending said blade permitting shifting thereof in respect to the opening of said drop shaft in dependence upon the load of material exiting from said drop shaft, including an air sifter adjacent said drop shaft into which said sifter blade extends, means in said air sifter defining a sifting duct for the up flow of air and small material particles which are delivered off said shake conveyor, said means defining said sifting duct including at least one single piece movable wall portion, and means mounting said movable wall permitting selective parallel and inclined adjustment of said wall.

6. An apparatus, according to claim 5, including first control means for shifting said movable wall in a parallel manner, and second adjusting means for shifting a selective end of said wall for inclining said wall in respect to the axis of said shifting duct.

7. An apparatus, according to claim 5, including a first hand wheel located on one wall of said sifter housing for adjusting said movable wall adjacent its one end and a second hand wheel located on another wall of said housing for adjusting said movable wall adjacent its opposite end.

8. An apparatus according to claim 5, including an outlet gate defined in said sifter housing adjacent said sifting duct and located below the uppermost portion of said duct to receive the fine materials.

9. An apparatus, according to claim 8, wherein said outlet gate includes an outlet chamber, a first flap pivotally closing said outlet chamber to said outlet gate, and a second flap pivotally closing said chamber at its discharge, said outlet gate having a width corresponding to the width of the sifting duct.

10. An apparatus, according to claim 8, wherein said outlet gate has a width equal to the width of the said sifting duct.

11. An apparatus, according to claim 5, including an air outlet adjacent the upper end of said sifter housing, and throttle means for regulating the amount of air which is discharged through said air outlet.

12. A sifter for bulk material comprising, a housing having a wall with an opening through which material is introduced, an inlet opening in said wall for directing air into said housing adjacent the introduction of the material, means defining a sifting duct extending upwardly from said material introduction opening, means defining a discharge chute extending from the upper end of said housing adjacent the top of said sifting duct and terminating in a lower discharge opening, said means defining said sifting duct including a single piece movable intermediate division wall subdividing said sifting duct, and means mounting said wall to permit separate and combined displacement of the top and bottom portions thereof for varying the flow area in a uniform end of said sifting duct.

13. A sifting device, according to claim 12, including means pivotally mounting said movable wall adjacent its upper end, and control means connected to said wall for shifting said wall.

14. A sifting device, according to claim 12, including first and second control means connected to the respective ends of said movable wall for shifting said wall in a parallel manner and for shifting a selected end of said wall.

15. A sifting device, according to claim 12, wherein said housing includes a curved upper wall extending from said duct around in a curve for directing the air entrained material against said curved wall, said chute being defined below said curved wall for receiving the fine materials which are carried over with said air through said sifting duct, an air outlet located adjacent the top of said housing behind said curved wall, and throttle means for regulating the air directed outwardly through said air outlet.

16. A sifting device, according to claim 12, including an outlet compartment defined at the discharge end of said chute, said compartment being connected at its upper end to said chute and having a lower end for the discharge of material therethrough, a first pivotal flap being pivotally movable between a position closing said upper end of said compartment and opening said upper end, a second flap pivotally movable between positions at which it closes said lower end and opens said lower end, and means for moving said first and second flaps to close and open the respective ends of said compartments in a manner such that the opened one of said flaps is closed before the other is opened.

17. A device, according to claim 16, including means for operating said flaps to effect instant striking movement of said flaps during each cycle of operation for shaking material off said flaps.

References Cited

UNITED STATES PATENTS

| | | | |
|---|---|---|---|
| 36,980 | 11/1862 | Irvin | 209—149 X |
| 1,188,323 | 6/1916 | Richardson | 209—139 X |
| 1,198,092 | 9/1916 | Wilhelm | 209—149 X |
| 1,868,404 | 7/1932 | Zeigler | 222—199 |
| 2,347,964 | 5/1944 | Otto | 222—199 X |
| 2,439,861 | 4/1948 | Pootjes | 222—445 |
| 2,850,162 | 9/1958 | Widmer | 209—134 |

FOREIGN PATENTS

| | | |
|---|---|---|
| 229,291 | 12/1910 | Germany. |
| 564,839 | 11/1932 | Germany. |

OTHER REFERENCES

Adelsberger, German application 1,145,548, printed Mar. 14, 1963.

FRANK W. LUTTER, *Primary Examiner.*

U.S. Cl. X.R.

209—147, 154; 222—199